United States Patent [19]

Polak

[11] Patent Number: 4,502,350

[45] Date of Patent: Mar. 5, 1985

[54] PUMP DRIVE MECHANISM

[75] Inventor: James C. Polak, Indianapolis, Ind.

[73] Assignee: General Motors Corporation, Detroit, Mich.

[21] Appl. No.: 539,484

[22] Filed: Oct. 6, 1983

[51] Int. Cl.³ .............................................. F16H 47/00
[52] U.S. Cl. .......................................... 74/730; 74/762
[58] Field of Search ................ 74/730, 762, 763, 789, 74/792

[56] References Cited

U.S. PATENT DOCUMENTS

| | | | |
|---|---|---|---|
| Re. 27,553 | 1/1973 | Cole | 74/730 |
| 2,745,295 | 5/1956 | Burnett | 74/732 X |
| 2,905,023 | 9/1959 | Morris | 74/792 |
| 3,314,307 | 4/1967 | Egbert | 74/763 X |
| 3,554,056 | 1/1971 | Cole | 74/730 |
| 3,665,707 | 5/1972 | Koivunen | 74/730 X |
| 3,733,920 | 5/1973 | Annis | 74/763 |
| 4,233,861 | 11/1980 | Gaus et al. | 74/763 |
| 4,331,044 | 5/1982 | Bookout et al. | 74/762 |

Primary Examiner—Lawrence J. Staab
Assistant Examiner—Dwight G. Diehl
Attorney, Agent, or Firm—Donald F. Scherer

[57] ABSTRACT

A pump drive mechanism for use with a vehicle transmission includes a differential gear arrangement having members drivingly connected to the transmission input, the transmission output and the pump drive shaft. The connection to the pump drive shaft is via a one-way clutch. The transmission output is also connected to the pump drive shaft through a one-way clutch.

2 Claims, 2 Drawing Figures

PUMP DRIVE MECHANISM

The invention herein described was made in the course of work under a contract or subcontract thereunder with the Army Tank Automotive Command.

This invention relates to pump drives and more particularly to pump drives having plural inputs.

In the prior art, plural input pump drives have been proposed for vehicle transmissions. U.S. Pat. No. Re. 27,553 issued Jan. 16, 1973 in the name of E. N. Cole, discloses a control pump which is driven by both the transmission input shaft and the transmission output shaft through separate one-way clutches. U.S. Pat. No. 3,733,920 issued May 22, 1973 in the name of R. E. Annis discloses a transmission including one-way devices for mechanically engaging the transmission operating clutches to provide a drive connection from the transmission output to the transmission input. The transmission input is connected through a one-way device to drive the transmission pump. The transmission pump also has an input drive from the vehicle engine through a one-way device.

The present invention provides a plural input mechanism for driving a pump wherein the pump can be driven at an increased speed when the transmission output is stationary and the transmission input is rotating. This provides an increased volume of control fluid, which is used for transmission operation and lubrication at lower engine speeds. The pump drive mechanism also provides for a one-to-one drive ratio between the transmission output and the pump input whenever the output is driven and the transmission input is stationary or rotating at a slower speed.

It is therefore an object of this invention to provide an improved pump drive mechanism for a vehicle transmission control pump wherein a differential mechanism and a pair of one-way drive devices are disposed between the transmission input and output shafts and the pump drive shaft so that an input drive to the pump is established when either one or both of the transmission shafts are rotating.

It is a further object of this invention to provide an improved pump drive mechanism for a transmission pump wherein a differential mechanism and a pair of one-way drive devices are disposed between the transmission input and output shafts and the pump drive shaft such that a continuous input drive is provided for the pump and also wherein the pump speed is increased relative to the transmission input speed when the transmission input shaft is rotating at a speed greater than the transmission output shaft.

These and other objects and advantages of the present invention will be more apparent from the following specification and drawings in which.

Figure 1:
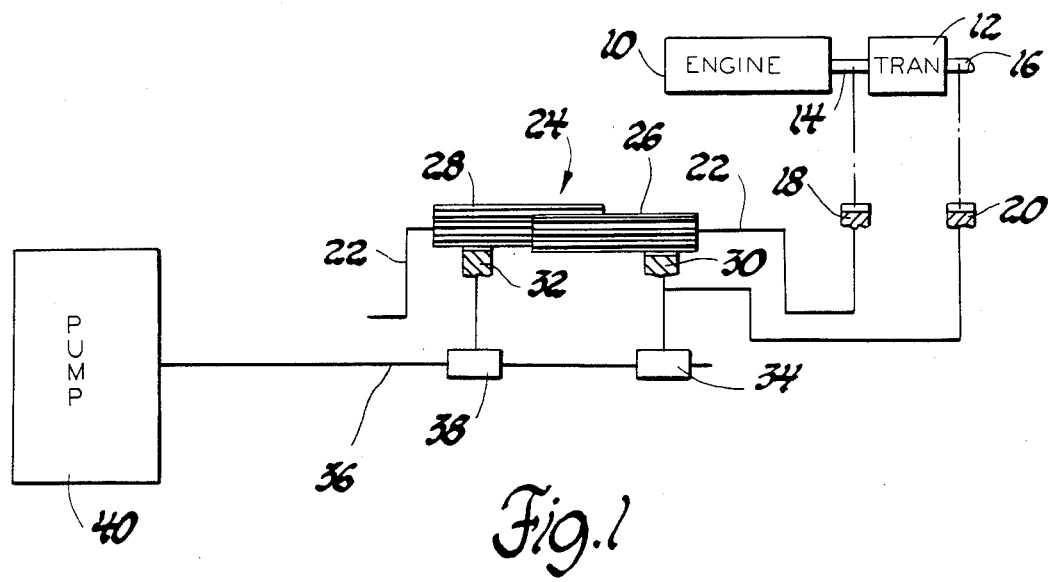
FIG. 1 is a diagrammatic representation of a pump drive mechanism.

Referring to the drawings, there is seen in FIG. 1 a conventional internal combustion engine 10 which is operative to power a conventional vehicle transmission 12 through an input shaft 14. The transmission 12 has an output shaft 16 adapted to drive the vehicle wheels or other ground engaging mechanism, not shown. The input shaft 14 is connected to drive an input drive gear 18, while the transmission output shaft 16 is connected to drive an output drive gear 20.

The input drive gear 18 is connected to a planet carrier 22 which is a component of a differential gear mechanism, generally designated 24. The differential gear mechanism 24 also includes a plurality of pairs of intermeshing pinion gears 26 and 28 rotatably mounted on the planet carrier 22. Only one pair of the pinions 26 and 28 is shown in FIG. 1. The pinion gear 26 is meshing with a pump input gear 30 and the pinion 28 is meshing with a pump input gear 32. The pump input gears 30 and 32 may be considered part of the differential gear mechanism 24.

The output drive gear 20 is drivingly connected to the pump input gear 30, both of which are drivingly connected through a conventional one-way device 34 with a pump drive shaft 36. The pump input gear 32 is drivingly connected through a one-way device 38 with a pump drive shaft 36. The pump drive shaft 36 is operative to drive a conventional hydraulic pump 40. The pump 40 can be utilized to provide control pressure for operating the various clutches and brakes within the transmission 12 as well as supply fluid to a torque converter within the transmission 12. The pump 40 can also provide lubrication and cooling fluid for the transmission 12. If desired, the pump 40 can be designed to be a multiple output pump such that engine lubrication can be provided. A source of hydraulic pressure for operating hydraulically operated implements utilized with the vehicle, not shown, can also be provided.

When the transmission input shaft 14 is rotating and the transmission shaft 16 is stationary, the input drive gear 18 will rotate while the pump input gear 30 is stationary. The planet carrier 22 rotates with the input drive gear 18 as do the intermeshing planet gears 26 and 28. Due to the stationary status of pump input gear 30, the pinion gears 26 and 28 will rotate on their mountings in carrier 22. The combination of rotation of carrier 22 and the rotation of pinion gear 28 will result in rotation of pump input gear 32.

The speed of pump input gear 32 will be greater than the speed of input drive gear 18. Since the pump input gear 32 will drive the pump drive shaft 36 through the one-way device 38, the speed of pump 40 will also be greater than the speed of input drive gear 18.

As is generally the case in transmission design, the input drive gear 18 is rotated at engine speed. Therefore, the pump 40, at engine idle, will provide more fluid volume per unit time than a pump of the same displacement in a conventional drive system.

As the vehicle begins to move, the transmission output shaft 16 rotates such that pump input gear 30 will rotate. The rotation of pump input gear 30 causes the speed of pump input gear 32 to decrease relative to the speed of input gear 18. When input drive gear 18 and output drive gear 20 are rotating at the same speed, pump input gears 30 and 32 and therefore pump drive shaft 36 will also rotate at this speed. If the transmission input shaft 14 should be stalled, the input drive gear 18 will be stationary. At this time, if the vehicle is moving, for example coasting downhill, the output gear 20 will rotate due to the rotation of transmission output shaft 16. Rotation of output drive gear 20 will cause rotation of pump input gear 30 and, through one-way device 34, rotation of the pump drive shaft 36. Since the pump drive shaft 36 is rotating, the pump 40 will be operable to provide hydraulic fluid.

From the above description of operation, it will be appreciated that the pump 40 provides hydraulic fluid whenever the transmission input shaft 14 is rotating or whenever the output shaft 16 is rotating or when both shafts 14 and 16 are rotating. Should output shaft 16 be rotating in a reverse direction when the input shaft 14 is stationary, the one-way device 34 will be inoperative; but the differential mechanism 24 and one-way device 38 will provide an input drive to the pump shaft 36 through the rotation of pinion gears 26 and 28 and input pump gear 32.

Figure 2:
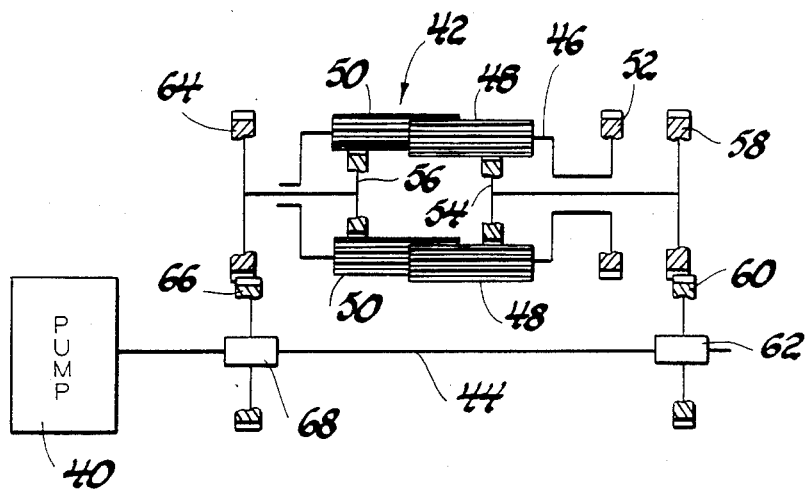
FIG. 2 is a diagrammatic representation of an alternate embodiment of the pump drive mechanism.

The pump drive mechanism shown in FIG. 2 is similar to that shown in FIG. 1 with the exception that a differential mechanism, generally designated 42, is disposed on an axis parallel to but displaced from the axis of a pump drive shaft 44. The differential mechanism 42 includes a planet carrier 46 on which is rotatably disposed intermeshing pairs of pinions 48 and 50. The carrier 46 is also drivingly connected to an input drive gear 52 adapted to be driven by a transmission input shaft.

The differential 42 also includes an input gear 54 meshing with the pinions 48 and an output gear 56 meshing with the pinions 50. The input gear 54 is drivingly connected with an output drive gear 58 adapted to be driven by a transmission output shaft. The output drive gear 58 also meshes with a pump input gear 60, which through a one-way mechanism 62, is operatively connected with the pump drive shaft 44. The output gear 56 is drivingly connected with a drive gear 64 which meshes with a pump input gear 66 which in turn, through one-way device 68, is operatively connected with the pump drive shaft 44. The pump drive shaft 44 is connected to drive the hydraulic pump 40.

The operation of the differential mechanism 42 is essentially the same as the differential mechanism 24. The input gear 54 and output gear 56 have replaced the pump input gears 30 and 32 of FIG. 1. However, this does not affect the operation of the differential mechanism. As with FIG. 1, if gear 52 is rotated and gear 58 is held stationary, the pump drive shaft 44 will be rotated through gear 66 and one-way mechanism 68 at a speed greater than the speed of gear 52. If the gear 58 is rotated forwardly while the gear 52 is held stationary, the pump drive shaft 44 will be driven through gear 60 and one-way mechanism 62.

If both gears 52 and 58 are rotated at the same speed, the pump drive shaft 44 will also be rotated at that speed. It is therefore apparent that the embodiment of FIG. 2 provides the same advantages as the embodiment of FIG. 1. However, the embodiment of FIG. 1 provides a more compact assembly and is thetefore the preferred embodiment.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic pump drive for use with a transmission mechanism having an engine driven member and an output driven member, said pump drive comprising; a pump drive shaft drivingly connected to a hydraulic pump; a pair of input drive means each including a one-way drive mechanism operatively connected with said pump drive shaft; output drive gear means drivingly connected to the output driven member of said transmission and to one of the input drive means; differential gear means including a carrier member, and intermeshing pinion gear means rotatably supported on said carrier member; input drive gear means drivingly connected to said carrier and to the engine driven member whereby said carrier is rotated at the same speed as said engine driven member, the other of said input drive means and said pump drive shaft being driven through said differential gear means at a speed greater than the engine driven member when the transmission output speed is less than the transmission input speed and said one input drive means and said pump drive shaft being driven by said output drive gear means at the speed of said output driven member when such speed is greater than the speed of the engine driven member.

2. A hydraulic pump drive for use with a transmission mechanism having an engine driven member and an output driven member, said pump drive comprising; a pump drive shaft drivingly connected to a hydraulic pump; a pair of input gear members each including a one-way drive mechanism operatively connected with said pump drive shaft; a pair of drive gears connected with respective ones of said input gears, one of said drive gears being drivingly connected to the output driven member of said transmission; a differential gear mechanism including a carrier member, an input gear and an output gear operatively connected between said drive gears; a third drive gear drivingly connected to said carrier and to the engine driven member whereby said carrier is rotated at the same speed as said engine driven member, said second drive gear, one of said input gear members and said pump drive shaft being driven through said differential mechanism at a speed greater than the engine driven member when the transmission output speed is less than the transmission input speed and said other input gear member and said pump drive shaft being driven by said output driven member at the speed of said output driven member when such speed is greater than the speed of the engine driven member.

* * * * *